July 3, 1962 T. N. CUMMINGS ETAL 3,041,802
METHOD OF FORMING A SEALED CONICAL CONTAINER
Filed Nov. 24, 1954 2 Sheets-Sheet 1
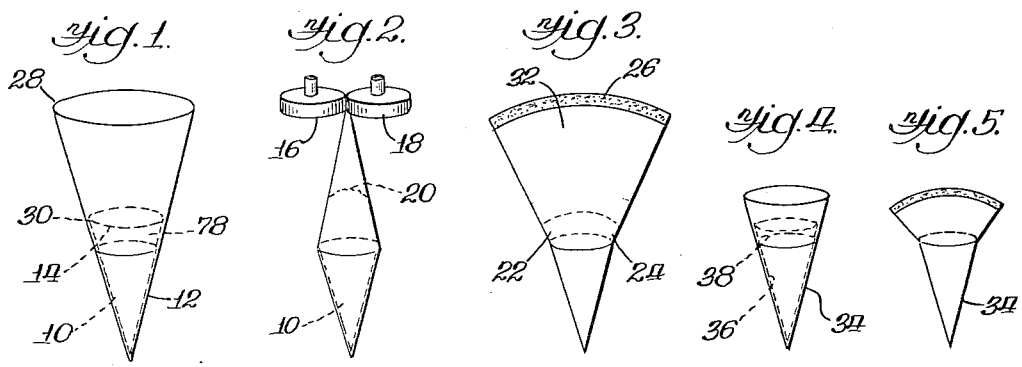
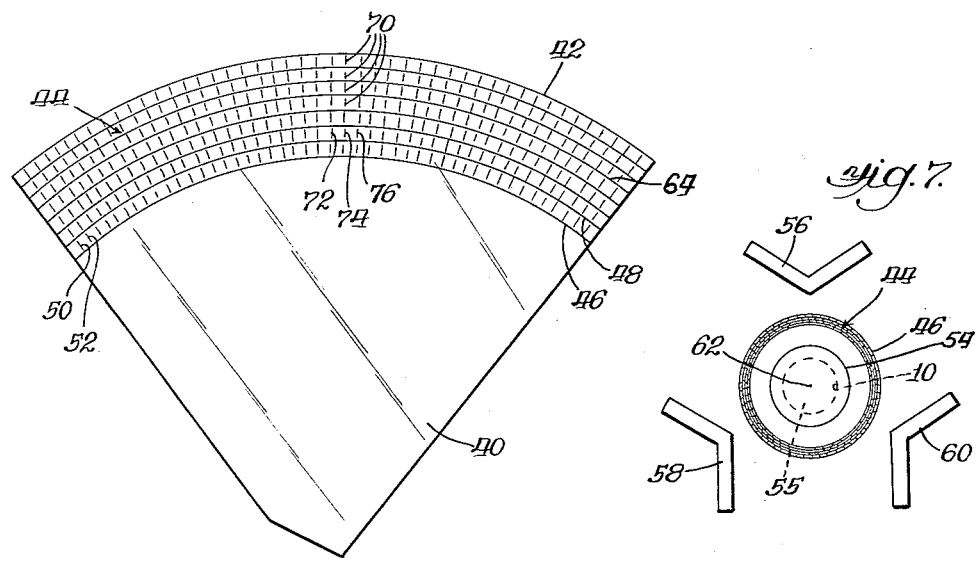
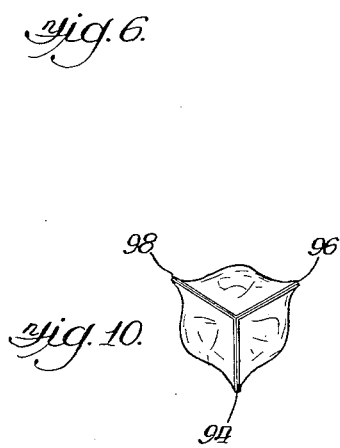
INVENTORS.
Thomas N. Cummings
Benjamin R. Peterson, Jr.
Thomas P. Shiu
By: William S. Stone
Atty.

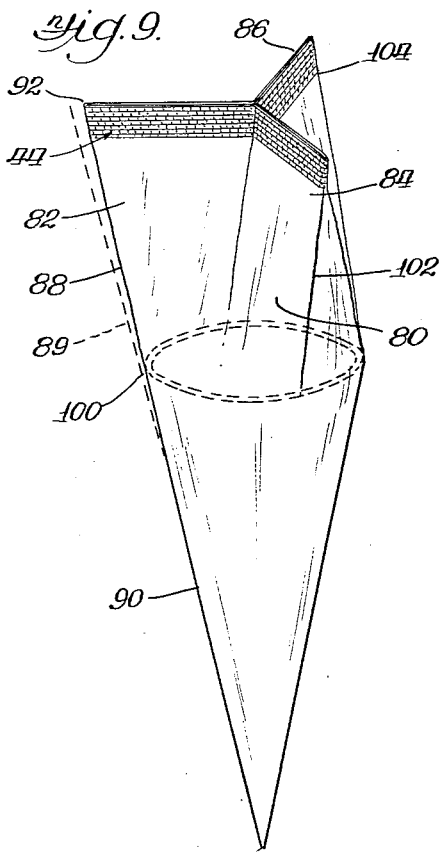
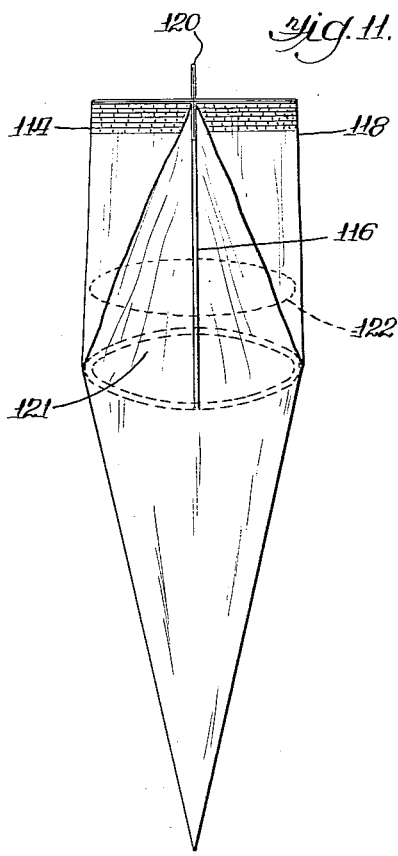
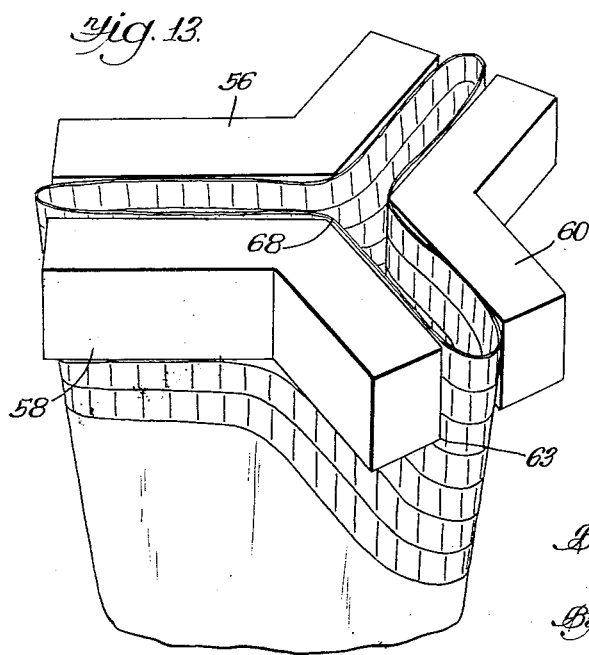
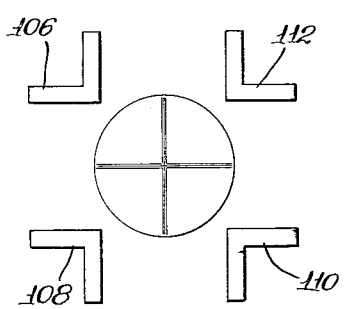

United States Patent Office 3,041,802
Patented July 3, 1962

3,041,802
METHOD OF FORMING A SEALED CONICAL CONTAINER
Thomas N. Cummings, Chicago, Benjamin R. Peterson, Jr., Wheaton, and Thomas B. Shiu, Chicago, Ill. (all % C.P.S. Manufacturing Co., 4801 S. Western Ave., Chicago, Ill.), assignors of one-quarter to Nicholas A. Cummings, Chicago, Ill.
Filed Nov. 24, 1954, Ser. No. 470,926
4 Claims. (Cl. 53—39)

This invention relates to an ice cream cone hermetically sealed in a conical wrapper, to a paper blank for the wrapper, and to a method of forming the sealed conical container.

The general object of this invention is to hermetically seal within a conical wrapper an ice cream cone so as to obtain all possible sanitary advantages. More specifically, applicants' object is to hermetically seal an open-topped, conical container which is filled above its rim with flowable material within a conical wrapper so as not to deform the material above the rim from any selected convex shape. Still more specifically, the object of this invention is to hermetically seal an ice cream cone filled above its brim in a paper jacket at a time when the ice cream is still soft.

Referring to schematic FIGURES 1 and 2, a sugar cone 10 inside a paper cone 12 has been filled with soft ice cream to the level 14. Assuming that the paper is made of heat-sealable material, if it is passed between the sealing rolls 16 and 18, see FIGURE 2, the paper will assume the triangular cross section shown in FIGURE 2 with the widest spread of the paper at the rim of the sugar cone 10. This squeezes some of the soft ice cream upwardly to the level 20, shown in FIGURE 2, and because of the configuration which the upper part of the cone assumes which is shown in FIGURE 3, forces some of the ice cream into the spaces 22 and 24. The dots at 26 represent the seal.

The disadvantages of this arrangement are such that the cone is uncommercial and unmarketable. Firstly, in order to reduce the deformation, the height of the paper cone has been greatly increased, that is, from the points 28 to 30 in FIGURE 1. Not only does this increase the amount of paper in the blank, but it makes it difficult to cut the blanks efficiently from the larger sheets of paper produced by the mill. Returning to FIGURE 3, the paper in the area 32 is waste. The overhanging ice cream portions at 22 and 24 are undesirable for when the paper is peeled off of the sugar cone, these overhanging portions adhere to the paper and are thrown away.

Referring now to FIGURE 4, applicants show a standard conical wrapper 34 enclosing a sugar cone 36 which has been filled with a soft ice cream to the level 38. In this case, the cone is placed in a freezing room or moved through a freezing tunnel. When this step is ended, the temperature of the ice cream may be at 5 to 10° F. The top of this very cold cone can be sealed without deforming it, as suggested in FIGURE 5. Actually, applicants are acquainted with no sealed conical container. The cone shown in FIGURE 4 is simply placed into a waxed bag and shipped to the market.

As the narrowest object set forth above indicates, applicants seek to hermetically seal in a paper blank an ice cream cone filled with soft ice cream to a point well above its rim immediately after filling and without delivering the ice cream to a hardening room or placing it on a conveyor through a hardening tunnel.

The features of applicants' invention which enable them to accomplish these objects are firstly, a method of bringing the inside walls of the rim of the conical paper container into engagement with each other from points which hold the straight line edge of the cone, that is, the edge 12 of FIGURE 1. This involves the formation of three vanes on the upper end of the conical paper container.

The second feature contributing toward the attainment of applicants' objects is the provision of scorings or bosses around the upper part of the conical paper container which weaken the container at this point so that when one brings the walls together, there is a heterogeneous breaking along these scorings which relieves the strain that causes the container to bend only at the rim of the sugar cone and thereby destroy the convex surface of the soft ice cream above the rim.

These and such other objects as may hereinafter appear are attained in the embodiment of the invention shown in the accompanying drawings, wherein:

FIGURES 1 through 5 are schematic illustrations of the effect of paper cones on deforming soft ice cream above the rim of a sugar cone during the making of a line seal across the top of the cone;

FIGURE 6 is a plan view of applicants' preferred blank;

FIGURE 7 is a schematic view illustrating how three heat-sealing elements appear from above a cone in a conical paper container immediately before the heat-sealing step;

FIGURE 8 is a schematic illustration showing the position of the heat-sealing elements after the closing step;

FIGURE 9 is a perspective view of applicants' finished filled container;

FIGURE 10 is a plan view of the container;

FIGURE 11 is a view of a container having four vanes;

FIGURE 12 is a top view of the container shown in FIGURE 11; and,

FIGURE 13 is a perspective view of one 120° heat-sealing element illustrating how the scorings of the maze bend.

Continuing to refer to the drawings, in FIGURE 6 the numeral 40 identifies a sector blank carrying a heat-sealable compound on its upper surface. The exact configuration of this blank is immaterial. Any tabs, protrusions or lands necessary for the blank to be formed and held in a conical shape by special machinery are immaterial for applicants' purposes. Applicants are concerned solely with the presence of a blank that can be formed into a cone and held there, and which has on those surfaces which must be brought into face-to-face relationship for sealing purposes sufficient sealable material to effect the joinder when properly pressed.

Formed in an annular sector commencing with the circumference 42 of the blank 40 and extending as much as two inches inwardly thereof, is a maze of discontinuous scorings 44. The scorings shown consist of continuous circular scorings such as 46 and 48 and radial scorings such as 50 and 52 which do not span the distance between the scorings 46 and 48. No particular design is required for these scorings, excepting that they should be rather close together and they should not be sufficiently deep in the paper so that they might break when the container is closed.

Referring now to the schematic FIGURES 1, 2 and 3, and supposing that the paper container 12 has been made of the blank shown in FIGURE 6, if this cone were passed through the rolls shown in FIGURE 2, the same end result would be obtained as that shown in FIGURE 3 for the reason that with the exception of the opening step of moving the upper part of the container between the rolls, all pressures would be directed in the plane of the surface and there would be no tendency to bend the container along any one of the scorings of the maze 44.

Referring now to FIGURE 7, applicants show a view looking down on their formed container 40 with the maze of scorings 44. The solid line 54 indicates the circumference of a chocolate coating on the ice cream while the inside dotted line 55 indicates the rim of the sugar cone 10. Schematically represented around the upper part of the container are three heat-sealing elements 56, 58 and 60, which are adapted to move simultaneously toward the axis 62.

When these three heat-sealing elements are snapped into engagement as indicated in FIGURE 8 (one-tenth second from FIGURE 7 to FIGURE 8) the rapidity of the movement tends to break the paper from its conical surface at points immediately adjacent the lower edge 63 of the heat sealers, as illustrated in FIGURE 13. Referring to FIGURE 6, if the height of the heat sealer equals the distance between the circumference 42 and the circular scoring 64, then the fast blow will tend to cause a bending along the circular scoring 64 and to a lesser extent along the circular scoring 48, and along those radial scorings which are adjacent to the vertical edge 68 of the heat-sealing member 58, see FIGURE 13, that is, along the scorings 70 of FIGURE 6, and to a lesser extent along some of the scorings such as 72, 74 and 76, which are below the heat-sealing element and which are not actually engaged by it. This action stems primarily from the speed of the closure stroke. The paper is struck a blow and even if there were no ice cream in the position 78, in FIGURE 1, there would be a tendency of the paper to retain the convex configuration above the rim of the sugar cone, that is, in the space indicated by the numeral 80 in FIGURE 9.

In fact, the ice cream does present some resistance. Its temperature is usually between 22 and 25° F. It must not be very stiff because the ice cream must approximately level out or assume a dome shape immediately after the extrusion ceases. The cones are filled one at a time at speeds well over one per second, which means that the nozzle drops into the cone, extrudes, withdraws, and within five or six seconds, the top seal is applied.

Referring now to FIGURE 9, the importance of sealing the top so as to form three vanes 82, 84 and 86, is evident. The length of the circumference of a cone in a plane at right angles to its axis is of course pi D, which means, referring to FIGURE 9, that the side edge 88 should flare outwardly slightly from the line 90 defining the edge of the cone, that is to the dotted line 89. Actually, this is hardly perceptible because the extra material in the circumference when formed into the three vanes is taken up by the bends so that when one looks at the cone as in FIGURE 9, the line 90 seems to be substantially continuous to the point 92. Considering this matter in a slightly different way and referring to FIGURE 10, what happens is that applicants' three heat sealers are working from three points on the circumference of the container which are 120° apart, namely, 94, 96 and 98. Through these points, the heat sealers form the creases 100, 102 and 104, which are the outer edges of the vanes 82, 84 and 86. The drawing of the paper into the three-vane end is effected without putting the strain on removing the convex surface 80 in FIGURE 9.

The shorter the arc distance between points 94 and 96, referring to FIGURE 10, the more readily will the container and the ice cream tend to retain their concave surfaces immediately above the sugar cone. Therefore, applicants designed a four-unit heat-sealing assembly comprising sealers 106, 108, 110 and 112, as schematically suggested in FIGURE 12. When these close the top of the container to form the four-vane container illustrated in FIGURE 12, the creases or outer edges of the vanes 114, 116, 118 and 120 no longer lie substantially in the projected surface of the cone, but assume positions parallel to each other and firmly re-shape the soft ice cream above the rim of the sugar cone somewhat into a cylinder. As expected, there is less tendency at the point 120 to deform the concave character of the paper container. Rather, at the level indicated by the line 122, the container would have an almost circular cross section which would remain constant for an inch or an inch and a half above the rim of the sugar cone.

Where the heat-sealing elements are moved toward each other slowly, applicants encountered the difficulty of the scorings of the maze 44 not yielding. This requires a very delicate balance between the weight of the paper and the depth of the scorings and the strength of the particular paper used. Conceivably, one could use a paper so soft and so pliable that no scorings would be necessary. Actually, these cones must be wrapped in a paper incapable of absorbing elements in the ice cream, which means that the surface must be waxed or lacquered and this requires a certain weight.

The ability to properly close in the top of the container without squeezing the ice cream into the configuration shown in FIGURE 2 depends of course in part upon the amount of paper extending above the sugar cone. The wrapper applicants actually use has a total height of eight and one-half inches and the ice cream cone has a height of about four and one-half inches. The ice cream is filled above the top of the edible cone by about three-quarters of an inch. The outside diameter of the cone at its rim is approximately one and three-quarter inches. Consequently, it may be said that applicants' wrapper must have a radius somewhat less than twice the height of the cone. The height would be a misleading measurement. What is important is the diameter of the cone at its rim. Applicants' wrapper should extend above the rim by one and one-half to two and one-half times the diameter of the sugar cone at its rim.

Having thus described their invention, what applicants claim is:

1. The method of closing an open-topped, conical container which is filled above its rim with a deformable material, comprising applying to said container a wrapper of flexible sheet material to produce a conical extension of said container terminating above said deformable material, said wrapper having a band of heat-sealable material around the inside of its terminal portion; forcing at least three points on said terminal portion inwardly to meet at the axis of the container so as to form radially-directed, double-thickness vanes with bands of heat-sealable material between confronting portions thereof; and forcing together and sealing said confronting portions of said vanes without substantially deforming the portion of said deformable material projecting above the rim of said container.

2. The method of claim 1 wherein the forcing of at least three points on said terminal portion is performed rapidly by non-yieldable, angularly-faced die members each having an apex directed toward said axis, so that their initial impact against the flexible sheet material will initiate folds or creases.

3. The method of closing an open-topped, conical container which is filled above its rim with a deformable material, comprising applying to said container a wrapper of flexible sheet material of the class of paper to produce a conical extension of said container terminating above said deformable material having a circular rim around its major axis, said wrapper having a band of heat-sealable material around the inside of its terminal portion; applying a force to said terminal portion in a direction at right angles to the axis by at least three complementary tools each having a leading edge substantially parallel to the container axis, and respectively formed by the intersection of plane surfaces, the total of the angles included between said surfaces of the tools, when converged, being 360° of arc, to meet at the axis of the container so as to form radially directed, double thickness vanes with bands of heat-sealable material between confronting portions thereof; and forcing together and sealing said confronting portions of said vanes without substantially deforming the portion of said deformable material projecting above the rim of said container, whereby the container is sealed closed by upstanding vanes radiating from a central, sealed, common meeting point at said axis.

4. The method of claim 3 wherein the movement of the tools toward each other is uniform and very rapid so that their initial impact against the paper will initiate folds or creases which tend to leave the shape of the lower conical portion of the container undisturbed.

References Cited in the file of this patent

UNITED STATES PATENTS

| | | |
|---|---|---|
| 1,599,267 | Amos | Sept. 7, 1926 |
| 1,756,919 | Becker et al. | Apr. 29, 1930 |
| 1,846,670 | Barbieri | Feb. 23, 1932 |
| 1,875,979 | Beutel | Sept. 6, 1932 |
| 2,019,841 | Black et al. | Nov. 5, 1935 |
| 2,070,838 | Orstrom | Feb. 16, 1937 |
| 2,108,418 | Thomas | Feb. 15, 1938 |
| 2,189,431 | Moore | Feb. 6, 1940 |
| 2,227,428 | Amberg et al. | Jan. 7, 1941 |
| 2,493,063 | Frank et al. | Jan. 3, 1950 |
| 2,518,970 | Zabel | Aug. 15, 1950 |
| 2,630,389 | Lipshutz | Mar. 3, 1953 |